US006258882B1

(12) United States Patent
Wachowiak, Jr.

(10) Patent No.: US 6,258,882 B1
(45) Date of Patent: Jul. 10, 2001

(54) WAX-RESIN SURFACE POLISHES

(75) Inventor: Melvin Joseph Wachowiak, Jr., Davidsonville, MD (US)

(73) Assignee: The Smithsonian Institution, Washington, DC (US)

( * ) Notice: Subject to any disclaimer, the term of this patent is extended or adjusted under 35 U.S.C. 154(b) by 0 days.

(21) Appl. No.: 09/219,445

(22) Filed: Dec. 23, 1998

(51) Int. Cl.[7] .............................. C08L 91/06; C08K 5/01; C08K 33/02
(52) U.S. Cl. ...................... 524/275; 524/277; 524/474; 524/475; 524/477; 524/478; 524/479; 524/487; 524/488; 524/489; 524/272; 106/10; 106/11; 427/11; 427/154; 427/421
(58) Field of Search ............................. 106/11; 524/275, 524/277, 474, 475, 477, 478, 479, 487, 488, 489, 272; 427/154, 11, 421

(56) References Cited

U.S. PATENT DOCUMENTS

| | | | |
|---|---|---|---|
| 2,561,816 | * 7/1951 | Pabst et al. ........................ | 524/277 |
| 4,046,726 | 9/1977 | Meiner et al. ...................... | 524/561 |
| 4,163,673 | 8/1979 | Dechert .............................. | 106/11 |
| 4,239,546 | 12/1980 | Russell et al. ..................... | 524/277 |
| 4,330,571 | 5/1982 | Stovall et al. ..................... | 106/285 |
| 4,347,333 | * 8/1982 | Lohr et al. ......................... | 106/10 |
| 4,354,871 | 10/1982 | Sutton ................................ | 106/11 |
| 4,398,953 | * 8/1983 | van der Linde ................... | 106/11 |
| 4,426,229 | 1/1984 | Bolton et al. ...................... | 106/11 |
| 4,432,797 | 2/1984 | Vasishth et al. ................... | 524/28 |
| 4,468,254 | 8/1984 | Yokoyama et al. ................ | 106/271 |
| 4,497,919 | * 2/1985 | Varga et al. ....................... | 524/456 |
| 4,732,612 | 3/1988 | Steer et al. ......................... | 106/11 |
| 4,748,196 | 5/1988 | Kuroda et al. ..................... | 524/275 |
| 4,766,166 | 8/1988 | Upadhyaya et al. ............... | 524/275 |
| 4,810,407 | 3/1989 | Sandvick ............................ | 106/11 |
| 4,898,751 | 2/1990 | Dwivedy ............................ | 524/487 |
| 4,942,193 | 7/1990 | Van Buskirk et al. ............. | 524/276 |
| 5,028,265 | 7/1991 | Schmidt-Thuemmes et al. .. | 524/487 |
| 5,049,186 | 9/1991 | Kawabata .......................... | 524/276 |
| 5,085,695 | 2/1992 | Randen et al. .................... | 524/277 |
| 5,127,414 | * 7/1992 | Mast et al. ......................... | 132/73 |
| 5,229,450 | 7/1993 | Van Buskirk et al. ............. | 524/487 |
| 5,338,345 | 8/1994 | Scarborough et al. ............. | 106/271 |
| 5,348,998 | 9/1994 | Ito et al. ............................. | 524/555 |
| 5,431,840 | 7/1995 | Soldanski et al. ................. | 106/5 |
| 5,445,670 | 8/1995 | Each et al. ......................... | 106/10 |
| 5,501,724 | 3/1996 | Loff .................................... | 106/11 |
| 5,556,450 | 9/1996 | Skodell et al. ..................... | 106/10 |
| 5,609,678 | * 3/1997 | Bergman ............................ | 106/311 |
| 6,066,313 | * 5/2000 | Anton et al. ....................... | 424/63 |

FOREIGN PATENT DOCUMENTS

| | | | |
|---|---|---|---|
| 1082153 | * 9/1967 | (GB) ................................... | 524/475 |
| 504824 | * 2/1976 | (SU) ................................... | 524/277 |

OTHER PUBLICATIONS

Hawley's Chemical Dictionary, Twelfth Edition, Van Nostrand Reinhold Co. N.Y. p. 1188, 1993.*
Grant & Hackh's Chemical Dictionary, Fifth Edition, McGraw–Hill Book Company N.Y. pp. 372, 510, 1987.*

* cited by examiner

Primary Examiner—Peter Szekely
(74) Attorney, Agent, or Firm—Rothwell, Figg, Ernst & Manbeck

(57) ABSTRACT

Polish formulations are provided which comprise:
  a) an aliphatic hydrocarbon solvent comprising 0–10% aromatic hydrocarbons;
  b) an acrylic resin; and
  c) a wax product that is thermoplastic, transparent, a solid at room temperature and has a melting/softening point of about 60° to about 90° C.; wherein wt:wt ratio of said acrylic resin and wax is about 1:3 to about 1:8 and the wt:wt ratio of said resin and wax to said solvent is about 1:1 to about 1:9. The formulations function as surface polishes that can be used on any hard surface including wood, metal, stone, and other non-porous surfaces.

39 Claims, No Drawings

WAX-RESIN SURFACE POLISHES

TECHNICAL FIELD

This invention relates to protective and decorative polish formulations which when applied to various surfaces protect and polish the surfaces without causing any detrimental effects. The polish formulations contain materials with long-term chemical stability that provide consistent high quality which is particularly important for preserving and refinishing antiques and historic objects.

BACKGROUND OF THE INVENTION

Wax- and silicone-containing polishes used for protective and decorative purposes are well-known in the art. They provide shine to furniture, floors, and other surfaces by leaving a glossy coating on the surface. Such polishes contain ingredients that protect surfaces from tarnish and weather, remove old coatings, clean, and/or smooth rough surfaces. Many polishes, however, contain ingredients which are detrimental to certain surfaces, especially the fragile surfaces of many antiques, for example, and also can be detrimental to the user's health.

Often, the glossy coating on a polished surface is caused by buffing a surface with a wax-containing polish. Examples of commonly used waxes include paraffin wax, carnauba wax, microcrystalline petroleum wax, vegetable wax, animal wax, and oxidized polyethylene and other synthetic polymeric waxes. Although useful, these wax formulations often fail to provide the desirable combination of durability and malleability. In addition, although synthetic waxes are not per se objectionable, they often can be problematic when added to certain formulations; the presence of certain synthetic waxes can make some formulations difficult to apply thinly and to buff to an even sheen. Polishes that are difficult to apply often can give the polished surface an unsatisfactory appearance.

If the glossy coating is not caused by a wax film, then it may be due to a silicone film created using dimethylsilicones or amino functional silicone products. The advantage of silicone is its ease of application. Silicone, however, can contaminate surfaces and can be difficult to remove, especially amino functional silicones which crosslink and bond to the surface being polished.

Polishing formulations also frequently comprise a solvent, typically a volatile organic solvent. Solvents in commercially available polishes generally have a high aromatic content which can be toxic to the user and potentially damaging to the object being polished. For example, some formulations contain the solvent kerosene which can damage historic and cultural artifacts, antiques, and other objects. Most known commercial polishes lack long-term stability and contain unspecified and variable ingredients or undesirable ingredients, resulting in products of inconsistent or deleterious quality. The use of such products can be detrimental to objects, especially museum-quality artifacts and fragile antiques, and can create application problems.

OBJECTS OF THE INVENTION

It is therefore an object of the present invention to overcome the disadvantages of known polishes by providing superior surface polishes that are safe and easy to use by professional finishers, cabinetmakers, collectors, and individual consumers. It is a further object of the invention to provide polishes which comprise an organic solvent having little to virtually no aromatic content, so that the health risks associated with the use of the polishes are low and the polishes can be used on almost any hard surface without harm. The polishes of the present invention combine low toxicity, ease of application, long term stability, and consideration of the fragile nature of cultural artifacts.

SUMMARY OF THE INVENTION

In accordance with the present invention, polish formulations are provided which comprise:

a) an aliphatic hydrocarbon solvent comprising a maximum of about 10% aromatic hydrocarbons;

b) an acrylic resin; and c) a wax product that is thermoplastic, transparent, a solid at room temperature and has a melting/softening range of about 60° to about 90° C.; wherein said acrylic resin and wax product are present in a wt.:wt. ratio of about 1:3 to about 1:8 and the wt:wt ratio of resin and wax to solvent is about 1:1 to about 1:9. Preferably the ratio of resin and wax to solvent is about 1:1 to about 1:5. Modifiers, such as colorants, abrasives, slip-reducing agents, preservatives and ultraviolet light inhibitors, also can be included in the formulation.

The formulations are intended to fill the need for polishing antiques and other fragile surfaces including wood, metal, stone, varnished or painted surfaces, and other non-porous surfaces. They also can be used to fill dents and cover scratches. The formulations contain ingredients of low toxicity, known long-term chemical stability, and high purity, e.g. pharmaceutical or food grade. An important feature of the polish formulations is the absence of strong alkaline or acidic components. Additionally, the formulations do not contain silicone and comprise an organic solvent which has very little or no aromatic content. Both silicone and organic solvents with a high aromatic content can be detrimental to the preservation of historic objects. Another advantage of the formulations is the low environmental impact due to a high solids content which creates few volatile organics. Thus, the formulations can be used by anyone, including professional conservators, on any stable surface, including furniture, statuary, floors, walls, and ceilings, that is not sensitive to the solvent in the formulations.

DETAILED DESCRIPTION OF THE INVENTION

The polish formulations of this invention function as a surface polish for polishing and preserving hard, stable surfaces such as wood, stone, metal, and varnished and painted surfaces. Applying the formulation is simple. The ingredients allow for easy, thin application (essential to a successful polish) so that the surface can be buffed readily by hand or machine. Left unbuffed, the polish becomes a matting agent. In addition, the polish is removable using mineral spirits and can be reapplied without having to remove the entire original coating.

Key ingredients in the formulations are an aliphatic hydrocarbon solvent, an acrylic resin, and a wax product that is both malleable and durable. The resin provides durability to the polish and can be selected from the group consisting of thermoplastic acrylic resins, such as polyisobutyl acrylic resins, and polybutyl methacrylate; polycyclohexanone resin, and mixtures thereof. The preferred resin is methacrylate resin, which is preferred due to its hardness and its ability to go into solution in aliphatic solvents. The concentration of the resin can vary from about 1% to about 13% by weight of the total formulation. The ratio of acrylic resin to the wax component of the formulation is within the range of about 1:3 to about 1:8. Desirably, the ratio of resin to wax is about 1:5 to about 1:7.

The acrylic resin should be soluble in the hydrocarbon solvent used in the formulation. Mineral spirits, heat, or a combination of the two can be used to enable the resin to go into solution with the aliphatic solvent. Thus, the resin optionally can be combined with mineral spirits at a preferred concentration of from about 1% to about 10%. The most preferred concentration is about 4%.

As noted above, the formulations contain a hydrocarbon solvent with a low aromatic content. "Low aromatic content" is defined to mean a maximum of about 10% aromatic hydrocarbons. Preferably, the aromatic content is less than about 1%. Examples of solvents with low aromatic content include Stoddard solvent, odorless mineral spirits, California Rule 66 solvent, and mixed alkanes solvents. Suitable mixed alkanes are those with a flash point of about 40° C. The most preferred solvent is Stoddard solvent. The preferred concentration of the solvent is from about 50% to about 90% by weight of the total formulation.

The ratio of solvent to the wax and resin components helps determine the consistency of the formulation. If it is desired for the formulation to have the consistency of a paste polish, the wt:wt ratio of solvent to resin and wax desirably is about 1:1 to about 4:1. If a liquid spray-on formulation is desired, the wt:wt ratio of solvent to resin and wax is increased to about 5:1 to about 9:1.

In addition to a resin and solvent, the formulations contain a wax product that is plastic, durable, thermoplastic, transparent, and solid at room temperature, and has a melting/softening point in the range of from 60° C. to 90° C. As used herein, "plastic" means a product that is pliable, non-glassy and fracture resistant; "durable" means that it retains its physical properties over time, and "thermoplastic" means that it will remain soluble in the same class of solvent and will not become cross-linked or insoluble over time. A single wax or a mixture of waxes can be used. The preferred wax product is a combination of a relatively hard, durable wax, such as shellac wax, and a softer, more malleable wax, such as beeswax. The preferred wt:wt ratio of shellac wax to beeswax is from about 0.5:1 to about 5:1, preferably about 1:1 to about 4:1. Desirable amounts of the wax component also can be expressed as weight percents of the total formulation. Desirably, the wax component is present at a concentration of about 7% to about 45% by weight of the total formulation. If a combination of beeswax and shellac wax is used, the shellac wax desirably is present at a concentration of about 2.5% to about 38% by weight and the beeswax is present at a concentration of about 1% to about 30% by weight of the total formulation. Similar concentrations apply if other combinations of hard and soft waxes are used in place of shellac wax and beeswax. Substitutes for shellac wax include other hard, durable waxes such as carnauba wax, synthetic polyethylene waxes, hard ozokerite, ceresin, vegetable waxes, and microcrystalline waxes. "Hard, durable" waxes generally have a melting temperature of about 70° to about 90°. Substitutes for beeswax include other soft, malleable waxes such as soft, modified paraffin, sugar cane wax and commercial mixtures such as Ross Beeswax Substitute 628/5 which is a mixture of vegetable wax and hydrocarbon wax. "Soft, malleable" waxes are those with a melting temperature in the range of about 60° to about 70°.

If desired, the wax product can contain high quality synthetic waxes in addition to or instead of the combination of beeswax and shellac wax (or other natural waxes). If synthetic waxes are used as the sole wax component, typically at least two synthetic waxes will need to be combined to obtain a wax product with the desired characteristics of durability, malleability, thermoplasticity, transparency, solidity at room temperature and melting/softening point in the range of from 60° C. to 90° C. Synthetic waxes are ideal for protecting metal surfaces such as bronze because natural waxes are slightly acidic and can promote corrosion.

Optional ingredients in the polish formulations include colorants. Colorants are color additives that combine the light-fastness of traditional inorganic pigments with the transparency of organic dyes. The pigments typically have a particle size of about 0.05–0.50 microns or less to retain transparency. Exemplary colorants include the Microlith T pigments from Ciba. Preferably, the colorant is present at a concentration of less than about 4%, but the concentration will vary depending upon the intended application of the formulation. Depending upon the hiding power of the pigment and the intended application of the product, the colorant concentration can be higher than 4%. In a paint-like coating or filler material, the pigment concentration could comprise 40% of the solids.

As an example, a colorant formulation can include a combination of Microlith T pigment (Ciba Pigments) pre-dispersed in rosin ester, Surfynol 61 surfactant (3,5-dimethyl-hexyn-3-ol (Air Products and Chemicals, Inc.)), xylene solvent, and Stoddard solvent, typically combined in a ratio of about 5:1:2:2. The colorant formulation can be made by combining these four materials in a high-torque stirring apparatus with a high-shear impeller. The solvent swells the pigment and carrier resin particles while the mixer disperses the particles. Initial mixing is at about 500 rpm for about 10 minutes, then lowered to about 3000 rpm for approximately fifteen minutes, and finally lowered to about 1500 rpm for approximately ten minutes, resulting in a highly viscous paste. The paste then is added to the resin-wax mixture while the latter is hot. The xylene solvent and the surfactant dissipate during the blending process primarily through evaporation so that undesirable solvents are absent from the final polish formulation.

Color is only one type of modifier. Other modifiers which can be added depending upon the intended use of the polish formulation include ultraviolet light absorbers, abrasives, preservatives, and slip-reducing agents such as rosin. A polish formulation containing rosin is desirable for polishing floors. Abrasives such as chalks, silicates, rottenstone, pumice, silicon carbides, aluminum oxides, silicas, tripoli, calcium carbonates and diatomaceous earth can be added so that the formulation functions as a delivery vehicle for the abrasives. Abrasives are selected based on intended effect, i.e., smoothing a rough surface or cleaning a surface, and on the nature of the surface to which they are applied. For example, certain abrasives, such as silicon carbide, are suitable for use on some metals and others, such as alumina, are suitable for use on some stone.

Suitable ultraviolet light absorbers include zinc oxide, benzotriazoles and benzophenones and typically comprise about 1% to about 3% by weight of the total formulation.

As mentioned above, the characteristics of the polish formulations can be changed by varying the proportion of hard to soft waxes or solids to solvent. For example, a high gloss can be obtained when a higher concentration of hard waxes (shellac wax, carnauba wax) are present, whereas a matte finish can result when a higher concentration of soft waxes (beeswax) are in the formulation. Similarly, a decrease in solid concentration results in a less viscous solution whereas an increase in solid concentration results in a thicker solution or paste. Formulations can be made to suit the desired delivery method. Delivery methods can be affected by the solids to solvent ratio; the formulation is sprayable in the absence of numerous solids and becomes paste-like when the solid concentration increases.

One advantage of the polish formulations is the flexibility of ingredients and ingredient concentrations as illustrated above. One skilled in the art can create a wide variety of polishes depending upon the intended use of the polish, the surface of the object, and the look that the skilled artisan desires.

A preferred method of making the formulations includes the following steps:
  (a) melting a wax or wax combination to make a melted wax product;
  (b) combining an aliphatic hydrocarbon solvent with a resin;
  (c) heating to about 50° C. the combination obtained from step (b);
  (d) mixing the heated combination obtained from step (c) with the wax product obtained from step (a);
  (e) agitating the mixture obtained from step (d) until the pour point, approximately 45° C.; and
  (f) transferring the agitated mixture from step (e) into containers.

In the most preferred method, shellac wax and beeswax are melted and combined in a wt:wt ratio of about 1:1 to about 4:1. Next, polyisobutyl methacrylate resin (45% in mineral spirits) is combined with Stoddard solvent in a wt:wt ratio of about 1:5 to about 1:9, heated to about 45° C., and mixed with the wax combination. The mixture is agitated until it reaches approximately 45° C., then is transferred to containers.

Method variations include foregoing the heating step (step (c)) and using only mineral spirits and low speed agitation to get the resin into solution. When additives such as colorants are used, they can be mixed with the resin/wax mixture in step (d).

The invention is illustrated by the following examples, which are provided for illustrative purposes and are not intended to be limiting.

EXAMPLES

Example 1

Hand-Buffable Paste Wax Polish
Ingredients
  120 g Stoddard solvent
  25 g Rohm & Haas Paraloid B67MT (45% solids polyisobutyl methacrylate in mineral spirits thinner)
  45 g shellac wax
  15 g beeswax The solvent and acrylic resin were incorporated together in a smooth-walled, heat resistant container in a water bath at approximately 50° C. using a low speed stirrer at 120 rpm for 10 minutes.

The shellac wax was heated to 80° C. in a water bath in a smooth-walled, heat-resistant container until melted. The beeswax was added to the melted shellac wax and the temperature was held at 70° C. until the beeswax was melted.

The solvent-resin mixture was added to the wax mixture with agitation using a low speed magnetic stirrer at 100 rpm in a smooth-walled, heat-resistant container for 5 minutes and the resultant mixture was allowed to cool to approximately 45° C. The cooled mixture was poured into a metal container fitted with a double-friction lid.

The resultant formulation is a paste at room temperature, can be buffed by hand and will achieve a high gloss.

Example 2

Liquid Cream
Ingredients
  600 g Stoddard solvent
  25 g Rohm & Haas Paraloid B67MT (45% solids polyisobutyl methacrylate in mineral spirits thinner)
  45 g shellac wax
  15 g beeswax The solvent and acrylic resin were mixed together in a smooth-walled, heat-resistant container in a water bath at 50° C. using a low speed stirrer at 120 rpm for 10 minutes.

The shellac wax was heated in a smooth-walled, heat-resistant container in a water bath to 80° C. until melted. The beeswax was added to the melted shellac wax and the temperature was held at 70° C. until the beeswax was melted.

The solvent-resin mixture was added to the wax mixture with agitation using a magnetic stirrer at 100 rpm for 5 minutes and the resultant mixture was allowed to cool to approximately 45° C. The cooled mixture was poured into a container such as a tube, dispensing pump or narrow-neck vessel.

The resultant formulation is a liquid at room temperature, can be buffed by hand and will achieve a high gloss.

Example 3

Colored Polish
Ingredients
  120 g Stoddard solvent
  25 g Rohm & Haas Paraloid B67MT (45% solids polyisobutyl methacrylate in mineral spirits)
  45 g shellac wax
  15 g beeswax
  6 g pigment base (described below)

The pigment base comprised 50% Ciba Microlith T, 20% xylene, 20% Stoddard solvent, and 10% Air Products & Chemicals Surfynol 61. All of the ingredients were incorporated at 500 rpm for 10 minutes with a high shear impeller on a pneumatic stirrer. The speed was increased to 3000 rpm for 15 minutes, then reduced to 1500 rpm for 10 minutes.

The solvent and acrylic resin were incorporated together in a water bath at 50° C. using a low speed stirrer at 120 rpm for 10 minutes.

The shellac wax was heated to 80° C. in a smooth-walled, heat-resistant container in a water bath until melted. The beeswax was added to the melted shellac wax and the temperature was held at 70° C. until the beeswax was melted.

The solvent-resin mixture was added to the wax mixture with agitation using a magnetic stirrer at 100 rpm for 5 minutes and the resultant mixture was allowed to cool to approximately 45° C. The colorant was added with agitation with the magnetic stirrer at 100 rpm for 5 minutes, then the mixture was poured into a metal can fitted with a double-friction lid.

The product is a paste at room temperature, can be buffed by hand and will achieve a high gloss. The colorant adds a light tint to the polish.

Example 4

Abrasive Cleaning Polish
Ingredients
  250 g Stoddard solvent
  25 g Rohm & Haas B67MT (45% solids poly-isobutyl methacrylate in mineral spirits)
  45 g shellac wax
  15 g beeswax
  30 g rottenstone abrasive The solvent and acrylic resin were incorporated together in a smooth-walled, heat resistant container in a water bath at 50° C. using a low speed stirrer at 120 rpm for 10 minutes.

The shellac wax was heated in a smooth-walled, heat-resistant container in a water bath heated to 80° C. until melted. The beeswax was added to the melted shellac wax and the temperature was held at 70° C. until the beeswax was melted.

The solvent-resin mixture was added to the wax mixture with agitation using a magnetic stirrer at 100 rpm for 5 minutes and the resultant mixture was allowed to cool to approximately 45° C. The abrasive was added with the stirrer at 100 rpm for 5 minutes, then the mixture was poured into a metal can fitted with a double-friction lid.

The resultant formulation is a paste at room temperature, can be buffed by hand and will achieve a high gloss through one-step abrasive process and deposition of wax coating.

Similar compositions can be made using any of the other abrasives listed in this application. The choice of abrasive depends upon the nature of the surface for which the formulation is intended.

What is claimed is:

1. A buffable liquid or paste formulation which consists essentially of:
   a) an aliphatic hydrocarbon solvent;
   b) an acrylic resin, polycyclohexanone resin or combination thereof soluble in said solvent; and
   c) a wax product that is thermoplastic, transparent, a solid at room temperature, and has a melting/softening point of about 60° C. to about 90° C.;
   wherein the wt:wt ratio of said resin and wax is about 1:3 to about 1:8 and the wt:wt ratio of said resin and wax to said solvent is about 1:1 to about 1:9; the formulation comprises from 0–10% aromatic hydrocarbons per total volume of hydrocarbon solvent; and the composition does not contain silicone.

2. The formulation of claim 1 wherein the aliphatic hydrocarbon solvent comprises Stoddard solvent, odorless mineral spirits, California Rule 66 solvent or mixed alkanes.

3. The formulation of claim 1, wherein the acrylic resin comprises polyisobutyl methacrylate resin or polybutyl methacrylate. wherein the formulation comprises from 0-10% aromatic hydrocarbons per total volume of hydrocarbon solvent—.

4. The formulation of claim 1 wherein the wax product comprises a mixture of waxes.

5. The formulation of claim 4 wherein the mixture of waxes comprises a first wax selected from the group consisting of shellac wax, carnauba wax, polyethylene wax, microcrystalline wax, ozokerite, ceresin, vegetable wax and a synthetic polyethylene wax, and a second wax selected from the group consisting of beeswax, soft paraffin and, sugar cane wax.

6. The formulation of claim 5, wherein the wax mixture comprises a mixture of shellac wax and beeswax in a wt:wt ratio of about 0.5:1 to about 5:1.

7. A formulation comprising Stoddard solvent, 40%–50% polyisobutyl methacrylate resin in odorless mineral spirits, shellac wax, and beeswax, wherein the shellac wax and beeswax are present in a wt:wt ratio of about 5:1 to about 0.5:1; and the wt:wt ratio of resin to wax is about 1:3 to 1:8 and the wt:wt ratio of resin and wax to solvent is about 1:1 to about 1:9.

8. The formulation of claim 7, wherein the ratio of shellac wax to beeswax is from about 1:1 to about 4:1 and the ratio of resin and wax to solvent from about 1:1 to about 1:5.

9. The formulation of claim 7, wherein the formulation is a paste.

10. The formulation of claim 7, wherein the formulation is a liquid spray-on.

11. The formulation of claim 7, which further comprises a colorant, a slip-reducing agent, an abrasive, an ultraviolet light absorber, or a combination thereof.

12. The formulation of claim 11, wherein the slip-reducing agent is rosin.

13. The formulation of claim 11, wherein the abrasive is selected from the group consisting of chalk, silicate, rottenstone (tripoli), pumice, and silicon carbide, aluminum oxides, silicas, calcium carbonates, and diatomaceous earth.

14. The formulation of claim 11, wherein the ultraviolet light absorber is selected from the group consisting of zinc oxide, benzotriazoles and benzophenones.

15. The formulation of claim 11, wherein the colorant is a pigment with a maximum particle size of about 5 microns.

16. A method of making a polishing formulation comprising an aliphatic hydrocarbon solvent, a resin, and wax, which comprises:
   (a) melting a wax or combination of waxes to make a melted wax product;
   (b) combining an aliphatic hydrocarbon solvent comprising from 0–10% aromatic hydrocarbons with an acrylic resin or polycyclohexanone resin or combination thereof;
   (c) heating to about 50° C. the combination obtained from step (b);
   (d) mixing the heated combination with the melted wax product obtained from step (a); and
   (e) agitating the resultant mixture until the pour point is reached.

17. The method of claim 16, wherein the solvent is selected from the group consisting of Stoddard solvent, odorless mineral spirits, California Rule 66 solvent and mixed alkanes.

18. The method of claim 16, wherein the resin is selected from the group consisting of polyisobutyl methacrylate resin, polybutyl methacrylate resin, polycyclohexanone resin and a combination thereof.

19. The method of claim 16, wherein a combination of waxes is melted to form the wax product.

20. The method of claim 19, wherein the combination of waxes comprises a combination of a wax selected from the group consisting of shellac wax, carnauba wax and a synthetic polyethylene wax; and a wax selected from the group consisting of beeswax, sugar cane wax and soft paraffin.

21. The method of claim 20, wherein the wax combination comprises a combination of shellac wax and beeswax in a wt:wt ratio of about 1:1 to about 4:1.

22. The method of claim 16, wherein the solvent is Stoddard solvent, the resin is polyisobutyl methacrylate resin in odorless mineral spirits, and the combination of waxes comprises a combination of beeswax and shellac wax.

23. A method of making a polishing formulation comprising an aliphatic hydrocarbon solvent, a resin, and wax, wherein the method comprises:
   (a) melting shellac wax;
   (b) melting beeswax;
   (c) combining the melted shellac wax with the melted beeswax;
   (d) combining Stoddard solvent with 45% polyisobutyl methacrylate resin in odorless mineral spirits;
   (e) heating the combination of solvent and resin to a temperature of about 40° to about 50° C.;
   (f) mixing the resultant heated combination with the melted combination of shellac wax and beeswax; and
   (g) agitating and heating the resultant mixture until the temperatures reaches about 45° C.;
   wherein the wt:wt ratio of resin to wax is about 1:3 to about 1:8 and the wt: wt ratio of resin and wax to solvent is about 1:1 to about 1:9.

24. A method of polishing or coating a surface comprising applying the formulation of claim 1, 6 or 7 to a surface which is not sensitive to the solvent and buffing the surface.

25. The method of claim 24, wherein the surface is selected from the group consisting of a painted surface, wood, a varnished surface, stone, plastic and metal.

26. The formulation of claim 7, wherein said formulation is in the form of a paste.

27. The formulation of claim 7, wherein said formulation is in the form of a liquid-spray-on.

28. A buffable liquid or paste formulation which consists essentially of:

a) an aliphatic hydrocarbon solvent;

b) an acrylic resin, polycyclohexanone resin or combination thereof soluble in said solvent;

c) a wax product that is thermoplastic, transparent, a solid at room temperature, and has a melting/softening point of about 60° C. to about 90° C.; and d) a colorant, a slip reducing agent, an abrasive, an ultraviolet light absorber, or a combination thereof;

wherein the wt:wt ratio of said resin and wax is about 1:3 to about 1:8 and the wt:wt ratio of said resin and wax to said solvent is about 1:1 to about 1:9; the formulation comprises from 0–10% aromatic hydrocarbons per total volume of hydrocarbon solvent; and the composition does not contain silicone.

29. The formulation of claim 28, wherein the slip-reducing agent is rosin.

30. The formulation of claim 28, wherein the abrasive is selected from the group consisting of chalk, silicate, rottenstone, pumice and silicon carbide.

31. The formulation of claim 28, wherein the ultraviolet light absorber is selected from the group consisting of zinc oxide, benzotriazoles and benzophenones.

32. The formulation of claim 28, wherein the colorant comprises a transparent pigment with a maximum particle size of about 0.5 microns.

33. The formulation of claim 1, wherein said formulation is in the form of a paste.

34. The formulation of claim 1, wherein said formulation is in the form of a liquid-spray-on.

35. The formulation of claim 28, wherein the aliphatic hydrocarbon solvent comprises Stoddard solvent, odorless mineral spirits, California Rule 66 solvent or mixed alkanes.

36. The formulation of claim 28, wherein the resin comprises polyisobutyl methacrylate resin, polybutyl methacrylate or poly-cyclohexanone resin.

37. The formulation of claim 28 wherein the wax product comprises a mixture of waxes.

38. The formulation of claim 37, wherein the mixture of waxes comprises a first wax selected from the group consisting of shellac wax, carnauba wax, polyethylene wax, microcrystalline wax, ozokerite, ceresin, vegetable wax and a synthetic polyethylene wax, and a second wax selected from the group consisting of beeswax, soft paraffin and sugar cane wax.

39. The formulation of claim 38, wherein the wax mixture comprises a mixture of shellac wax and beeswax in a wt:wt ratio of about 0.5:1 to about 5:1.

* * * * *